W. O. BATTS.
SAFETY APPARATUS FOR TRAINS OR CARS.
APPLICATION FILED JULY 2, 1921.
1,392,620.
Patented Oct. 4, 1921.
2 SHEETS—SHEET 2.
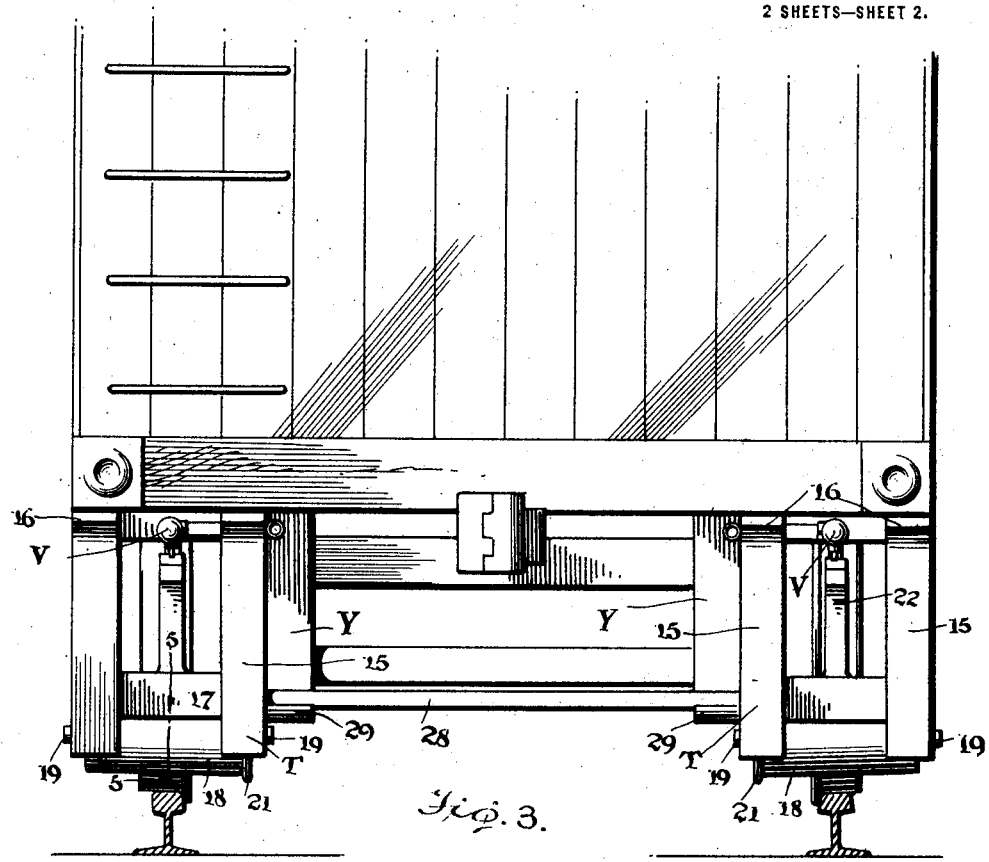
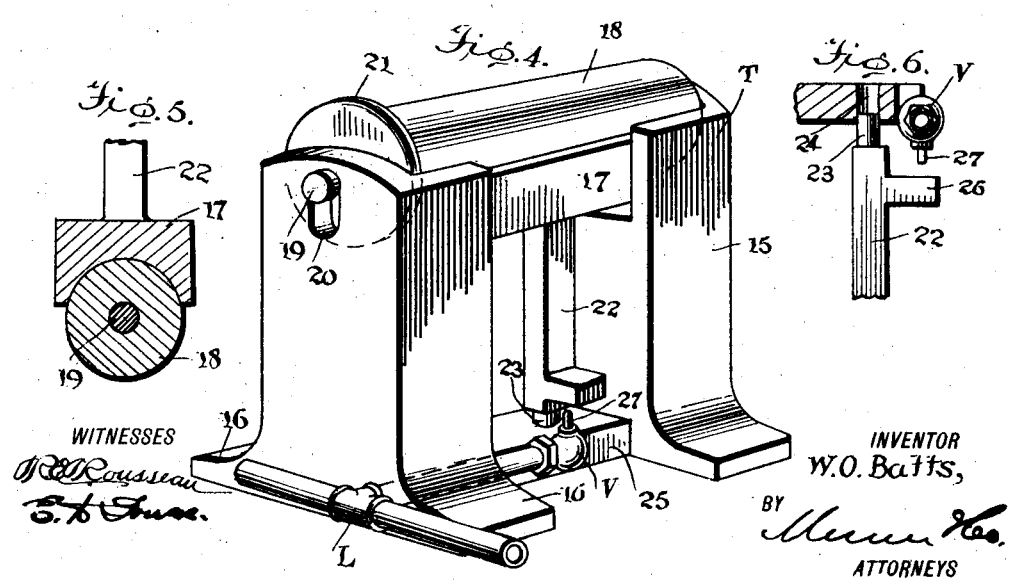

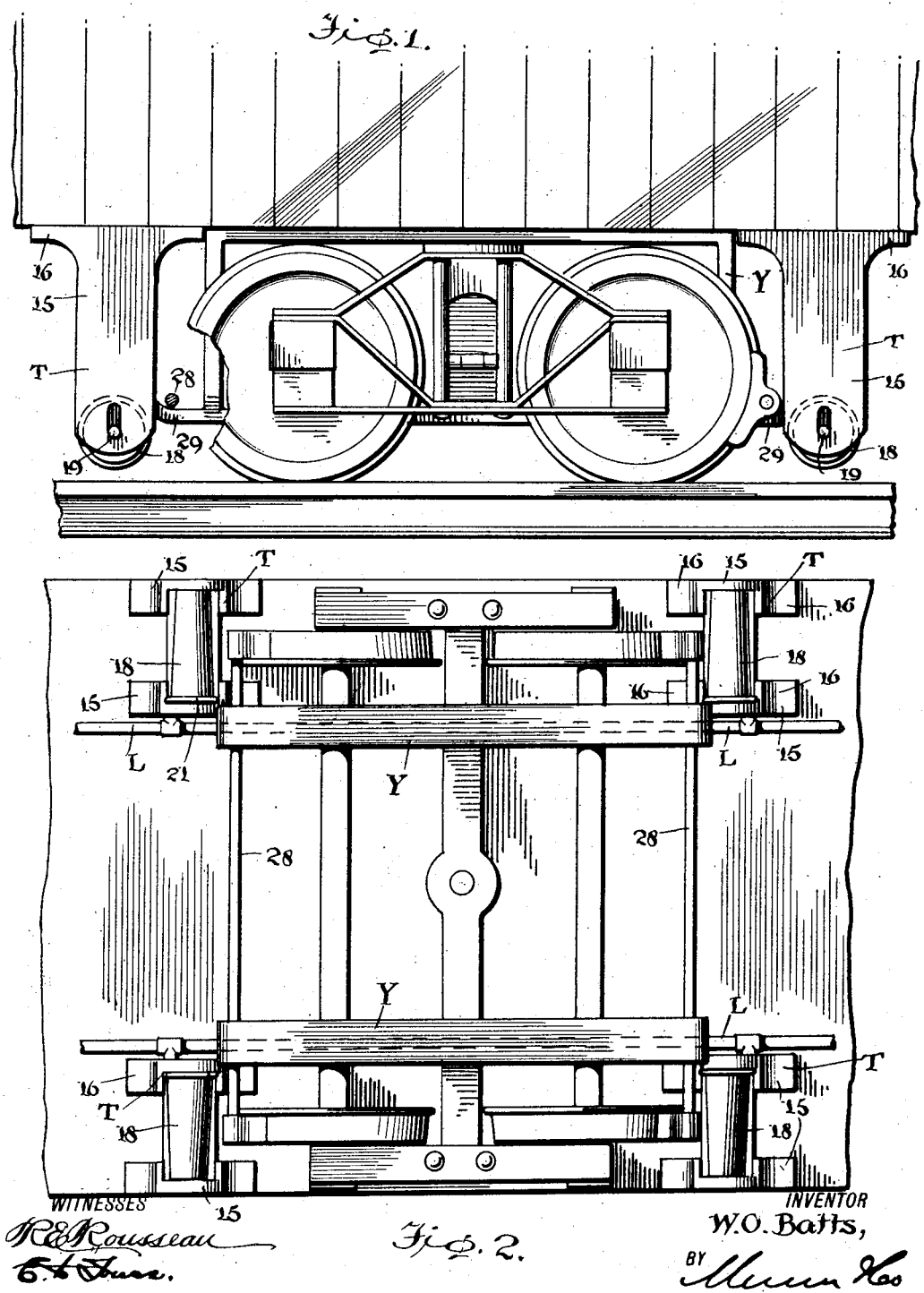

UNITED STATES PATENT OFFICE.

WILLIAM O. BATTS, OF WILMOT, KANSAS.

SAFETY APPARATUS FOR TRAINS OR CARS.

1,392,620.   Specification of Letters Patent.   Patented Oct. 4, 1921.

Application filed July 2, 1921. Serial No. 482,120.

*To all whom it may concern:*

Be it known that I, WILLIAM OSCAR BATTS, a citizen of the United States, and a resident of Wilmot, in the county of Cowley and State of Kansas, have invented certain new and useful Improvements in Safety Apparatus for Trains or Cars, of which the following is a specification.

My invention relates to trains and similar rolling stock, and a purpose of my invention is the provision of a safety apparatus designed to be associated with the wheel trucks of a car and the air brake system, and which operates when the train or car is derailed to effect actuation of the air brakes to stop the train, and which supports the train or car for rolling movement on the track rails and in such manner that the car wheels will be supported clear of the railway ties to prevent bumping of the wheels thereon with the attendant destruction or possible overturning of the car.

It is also a purpose of my invention to provide a safety apparatus which prevents the wheel trucks from turning to a transverse position with respect to the track when the truck is derailed, thus insuring of the proper functioning of the apparatus in supporting the truck for rolling movement on the rails.

I will describe one form of safety apparatus embodying my invention and will then point out the novel features thereof in claims.

In the accompanying drawings:

Figure 1 is a view showing in side elevation a wheel truck and a portion of car having applied thereto one form of safety apparatus embodying my invention.

Figs 2 and 3 are views showing in bottom plan and end elevation, respectively, the car, wheel truck, and apparatus shown in Fig. 1.

Fig. 4 is an enlarged detail perspective view showing in inverted position one of the supporting and brake actuating units comprised in the apparatus shown in the preceding views.

Fig. 5 is a detailed sectional view taken on the line 5—5 of Fig. 3.

Fig. 6 is a fragmentary detailed view of a portion of the brake actuating means shown in Fig. 4 but in inverted position with respect to said figure.

Similar reference characters refer to similar parts in each of the several views.

Referring specifically to the drawings, the safety apparatus in its present embodiment is made up of a plurality of car supporting and brake actuating units designated generally at T, and a pair of truck embracing yokes designated at Y. As illustrated to advantage in Fig. 4, each unit T comprises a pair of spaced hangers 15 formed at one end with flanges 16 through which fastening members are adapted to exend for securing the hangers in depending relation to the under side of a car. The opposite ends of the hangers are recessed at their confronting sides to loosely accommodate a bearing member 17. Rotatably fitted in the bearing member 17 is a roller 18 having the opposite ends thereof provided with axle ends 19 which are loosely fitted in elongated openings 20 formed in the hangers 15. The roller 18 is tapered in diameter from one end to the other, with the large end formed with an annular flange 21 that is adapted to function in the same manner as the flange of one of the car wheels. The bearing member 17 is provided with an arm 22 that extends between the hangers 15 so as to move with the member. As illustrated to advantage in Fig. 6, the free end of the arm 22 is provided with a circular extension 23 that is adapted to work within an opening 24 formed in a cross bar 25 connecting the hangers at their flanged ends. The arm 22 is also provided with a lateral projection 26 adapted to engage the stem 27 of a brake valve V, the latter being interposed in the train line L of an air brake system.

The yokes Y, as illustrated to advantage in Fig. 1, are of rectangular outline and are secured to the under side of the car and in spaced relation to each other so as to loosely embrace the wheel truck and the brake beams indicated at 28, the yokes being provided with hooked extensions 29 for supporting the brake beams. As shown in Fig. 2, the yokes Y are arranged longitudinally of the car, and are adapted to be so designed as to allow of the usual pivotal or swinging movement of the wheel truck in allowing the wheels to conform to the curvature of the track, but to prevent excessive movement thereof such as when the car is derailed. It is a well known fact that in the derailing of cars the wheel trucks often occupy transverse positions with respect to a car or track rail, thus effecting destruction of the rails and ties and enhancing the possibility of the car overturning. By the provision of the yokes the wheel trucks are prevented from occupying this transverse position.

In the applied position of each car supporting and brake actuating unit, the hangers 15 are secured to the under side of the car adjacent to the wheel truck so as to support the corresponding roller 18 in a position directly above the corresponding track rail as clearly shown in Fig. 3. In the present instance, I have provided four such units arranged at the four corners of a wheel truck and so that two of the rollers overlie one track rail, and the remaining rollers overlie the other track rail. The length of the hangers 15 is such that the rollers 18 are supported in spaced relation to the track rails so that they are normally out of contact therewith. By virtue of the elongated openings 24, the rollers are permitted to gravitate to such position that the arms 22 are in such a position that the projections 26 are out of engagement with the stems 27 of the valves V. The extensions 23 are of such a length that they are retained within the openings 20 in the lowered position of the rollers 18, thereby guiding the arms when moved upwardly so that the projections 26 will engage the valve stems 27.

In practice, the safety apparatus during the normal operation of the wheel truck remains inactive. However, when the wheels of the truck are derailed, the rollers 18 are lowered into contact with the track rails thus providing an auxiliary support for maintaining the car in rolling engagement with the rails of the track. As soon as the car is lowered by the disengagement of the wheels, the rollers are moved upwardly within the hangers thereby effecting an upward movement of the arms 22 to cause the projections 26 to engage the stems 27 and thus open the valves V to effect the bleeding of the train line with a subsequent actuation of the air brakes. It is to be understood that all of the rollers operate simultaneously to effect an opening of all of the valves V so that an effective bleeding of the train line is obtained to insure of the application of the brakes.

From the foregoing operation it will be clear that should any wheel truck of a car or a train of cars be derailed the apparatus automatically functions to actuate the brakes and thereby bring the train to a stop so that the complete derailing of the entire car or train is prevented.

The formation of the rollers 18 is such as to prevent the complete derailing of that portion of the car supported by the derailed truck, it being understood that because of the tapered formation of the rollers and the flanges 21, the rollers function in the same manner as the car wheels.

What I claim is:

1. A safety apparatus for cars comprising a plurality of units adapted to support a car for rolling movement on the rails of a track when the car wheels are derailed, brake actuating means forming a part of and operable by each of said units, and yokes adapted to be secured to the car and in embracing relation to the wheel truck for the purpose described.

2. A safety apparatus for cars comprising a plurality of units adapted to support a car for rolling movement on the rails of a track when the car wheels are derailed, a pair of hangers adapted to be secured in depending relation to the under side of a car, a bearing member supported for movement within the hangers, a roller journaled and movable vertically in the hangers, an arm formed on the bearing member, a projection formed on the arm, and a brake valve disposed in the path of movement of said projection so as to be opened by said projection when said roller occupies a predetermined position.

3. A safety apparatus for cars comprising a plurality of units adapted to support a car for rolling movement on the rails of a track when the car wheels are derailed, a pair of hangers adapted to be secured in depending relation to the under side of a car, a bearing member supported for movement within the hangers, a roller journaled and movable vertically in the hangers, an arm formed on the bearing member, a projection formed on the arm, and a brake valve disposed in the path of movement of said projection so as to be opened by said projection when said roller occupies a pre-determined position, and means for guiding said arm so as to insure of said projection engaging said valve.

4. In a safety apparatus of the character described, a pair of hangers adapted to be secured in depending relation to the under side of a car, a bearing member movable in the hangers, a roller seated within the bearing member, stub shafts formed in the roller, elongated openings formed in the hangers and receiving said stub shafts to allow vertical movement of the roller within the hangers, an arm fixed to and movable with the bearing member, a cross bar connecting the upper ends of the hanger and having an opening therein, an extension formed on the arm and movable within said opening, a brake valve between the hangers, and a projection formed on said arm and adapted to engage and open said valve when said arm occupies its uppermost position.

WILLIAM O. BATTS.